(12) United States Patent
Boghaert

(10) Patent No.: US 11,518,624 B2
(45) Date of Patent: Dec. 6, 2022

(54) SYSTEM FOR CONVEYING BULK COMPRISING A TROUGH HAVING AN OPENING AND A GATE FOR CLOSING THE OPENING

(71) Applicant: BES BVBA, Affligem (BE)

(72) Inventor: Maarten Boghaert, Affligem (BE)

(73) Assignee: BES BVBA, Affligem (BE)

( * ) Notice: Subject to any disclaimer, the term of this patent is extended or adjusted under 35 U.S.C. 154(b) by 0 days.

(21) Appl. No.: 17/254,872

(22) PCT Filed: Aug. 12, 2019

(86) PCT No.: PCT/IB2019/056829
§ 371 (c)(1),
(2) Date: Dec. 22, 2020

(87) PCT Pub. No.: WO2020/035771
PCT Pub. Date: Feb. 20, 2020

(65) Prior Publication Data
US 2021/0261356 A1   Aug. 26, 2021

(30) Foreign Application Priority Data
Aug. 13, 2018 (BE) .................................. 2018/5565

(51) Int. Cl.
*B65G 47/78*  (2006.01)
*B65G 27/04*  (2006.01)
*B65G 47/72*  (2006.01)

(52) U.S. Cl.
CPC ............. *B65G 47/78* (2013.01); *B65G 27/04* (2013.01); *B65G 47/72* (2013.01)

(58) Field of Classification Search
CPC ........ B65G 47/78; B65G 47/72; B65G 27/04; B65G 27/34
See application file for complete search history.

(56) References Cited

U.S. PATENT DOCUMENTS 6,119,849 A * 9/2000 Svejkovsky ........... B65G 27/18
                                                      198/860.4
6,378,688 B1 * 4/2002 Fitzgerald .............. B65G 27/04
                                                      198/360
(Continued)

FOREIGN PATENT DOCUMENTS

JP          5089934 B2     12/2012

OTHER PUBLICATIONS

Search Report for International Patent Application PCT/IB2019/056829, dated Feb. 20, 2020.

*Primary Examiner* — William R Harp
(74) *Attorney, Agent, or Firm* — Fresh IP PLC; Clifford D. Hyra; Aubrey Y. Chen

(57) ABSTRACT

Disclosed herein is a conveyor system including a conveying element with one or more bottoms and upright side walls, where the bottoms and the upright side walls together form a trough in which bulk products may be transported along a main flow, where the conveying element includes one or more openings through which bulk products may be poured, where the conveyor system includes a gate for closing a particular opening, where this gate may be moved between at least a closed position and an open position, where the one or more openings extend on the side walls, and where the gate may be moved slidably along the specified opening.

16 Claims, 3 Drawing Sheets

(56) References Cited

U.S. PATENT DOCUMENTS

| | | | |
|---|---|---|---|
| 8,727,104 B2 * | 5/2014 | Taylor | B65G 27/12 |
| | | | 198/758 |
| 9,630,786 B1 | 4/2017 | Svejkovsky | |
| 9,957,074 B2 * | 5/2018 | Petri | G01G 11/08 |
| 10,023,391 B2 | 7/2018 | Taylor | |

* cited by examiner

SYSTEM FOR CONVEYING BULK COMPRISING A TROUGH HAVING AN OPENING AND A GATE FOR CLOSING THE OPENING

FIELD OF THE DISCLOSURE

This disclosure relates to a conveyor system for bulk products, such as food products, comprising a conveying element with one or more contiguous conveying units, wherein each conveying unit comprises a bottom, a first upright side wall and a second upright side wall and wherein these one or more bottoms and these upright side walls together form a trough in which bulk products are movable along a main flow that extends along the trough, wherein the conveying element comprises an opening through which bulk products are able to fall from the conveying element to form a side flow of bulk products, wherein the conveyor system includes a gate for closing the opening, wherein this gate is movable between at least a closed position that almost completely closes the opening, and an open position that leaves the opening at least partially open so that bulk products are able to fall from the conveying element through the opening.

Such a conveyor system is used, for example, for packaging bulk products, where the flow rate of the main flow of bulk products is greater than the maximum flow rate that one packaging line with one or more packaging machines can manage. The main flow is accordingly branched off. Thus, the main flow may be branched off into one side flow, wherein for example a first packaging line connects to the end of the main flow and a second packaging line connects to the side flow. It is also possible to branch off the main flow in a plurality of side flows, with for example one packaging line connecting to each side flow. These side flows have a lower flow rate than the main flow and convey the bulk products, directly or indirectly, to the packaging machines. Such conveyor systems are used, for example, in producing food products such as (frozen) french fries and chips. For example, a production line produces 30 tons of fries per hour or more. A packaging line typically cannot process 30 tons of fries per hour. If the fries are packed in 2.5 kg bags, the packaging line can, for example, process 9 tons of fries per hour. When the fries are packed in 450 g bags, the packaging line can, for example, process 2.5 tons of fries per hour. A plurality of packaging lines is therefore used, and the main flow of fries from the production line is divided into a plurality of side flows, each of which supplies product to a packaging line. Typically, 6 to 8 packaging lines are used, and the conveying element in which the fries are transported along the main flow has then 6 or 8 openings respectively.

Such conveyor systems may, of course, also be used for other food products such as frozen vegetables, biscuits, etc. and may also be used for non-food products that are packaged in bulk, for example, such as dishwasher tablets, plastic objects, etc.

BACKGROUND

In conveyor systems, it is important that the bulk products are properly distributed among the packaging machines that are in operation. To this end, a conveying element with one or more openings is used, in which these one or more openings are closeable by means of one or more gates. By opening or not opening certain gates, it is possible to control the flow of bulk products per side flow. However, these existing conveyor systems have a number of drawbacks. During the opening and closing of the gates, bulk products may become stuck and/or damaged between the gates and the conveying element. This is a major problem in the case of bulk products that are prone to breakage, such as fries. In addition, when bulk products become stuck, the conveyor system at the height of the gate becomes fouled, and consequently these conveyor systems must be cleaned frequently. Distributing bulk products among the one or more openings is likewise not straightforward. If the conveyor system has a plurality of openings, too many bulk products often fall through the further-upstream openings, and consequently the side flows created there have too high a flow rate, while through the downstream openings often too few bulk products fall through. For example, it is quite possible that almost all of the bulk products fall through one opening, so that there is almost no product left for the subsequent openings. To solve this problem, large buffers are often used that connect to the openings and then a said opening with a respective gate is closed when the buffer is filled sufficiently. However, this in turn causes the problem that when the buffer is empty, the maximum drop height of the bulk products is large, and the bulk products may consequently be damaged. The bulk products may also become jammed or entangled in each other inside the buffers, with a resulting reduction in the quality of the bulk products and/or potential for blockages.

SUMMARY

It is therefore an object of the disclosure to provide such conveyor system that reduces the risk of damage to the product and where the distribution of bulk products among the one or more side flows is improved.

This object is achieved by providing a conveyor system having the characteristics indicated in the first paragraph of this description, in which a said conveying unit comprises the opening and this opening extends principally at the height of the first side wall of this conveying unit, and in which the gate is movably connected to the conveying unit in such a way that it is slidably movable along this opening.

As a result of providing such a conveying unit with the opening and this in such a way that the opening extends principally and preferably completely at the height of a said first side wall, the bulk products that lie against this first side wall, can easily pass through this opening when the gate is in its open position. If the flow rate of the main flow at the opening is relatively high, there is a greater chance here than with the existing conveyor systems, that some of the bulk products that are closer to the respective second side wall, will not pass through the opening and will therefore move further downstream along the main flow. The distribution of the bulk products may therefore be much better regulated, which reduces the need for a relatively high buffer at the opening. It is certainly still possible to use a buffer for additional certainty.

By working with a gate that slides along the opening, the risk of bulk products becoming caught at the height of the gate, during the opening and closing of the gate, is also reduced. This is because the gate moves smoothly along the opening. Preferably, the distance between the part of the gate that at least partially closes the opening and the conveying element is small, so that almost nothing may enter between the gate and the conveying element. For example, the gate preferably slides smoothly in front of the opening to close the opening, so that it is almost impossible that bulk products can become caught between the gate and the conveying element. References to a slidably movable gate signify that the gate slides along the opening. The shape of the opening here will determine how this sliding occurs. If, for example, the opening extends principally along a plane, the sliding will therefore also be principally along a plane. However, if the opening extends principally along a part of a cylindrical surface, the gate will, for example, move principally along this cylindrical surface and thus will move along a circular arc. The shape of the opening is determined by the shape of the first side wall, because the opening extends principally at the height of the first side wall. The first side wall may extend along a plane. If the opening then extends almost entirely at the height of the first side wall, the gate slides along a plane. The first side wall may also extend along a part of a circular surface. This because, for example, the first side wall is made up of a single curved section, or because the first side wall comprises a plurality of sheet metal parts, each of which extends in line with the main flow and one above the other, with these sheet metal parts positioned so that almost all of them touch the same circular surface. By using a plurality of sheet metal parts, a more solid side wall is obtained. If the opening then extends almost entirely at the height of the first side wall, the gate preferably slides along an arc.

A reference to an opening may refer to an opening that is completely enclosed by the conveying element, or an opening that is only partially enclosed by the conveying element. Thus, the opening may for example form a recess/notch of the said first side wall, being located at the upper edge of this first side wall. The opening may also extend over the full height of this first side wall and thus divide this first side wall into two wall sections. Such an opening, in that case, is bounded by the conveying element only at its bottom and sides. At the top, the opening is not bounded. However, there are also embodiments in which the first side wall comprises an upper edge at the top and in which this upper edge also bounds the opening.

The one or more conveying units are preferably horizontal motion conveyors. The one or more conveying units may extend consecutively in such a way that they extend along a first straight direction. The main flow, in that case, also extends along the first direction. If there are several conveying units, the bottom, first side wall and second side wall of each conveying unit preferably forms a trough section, and all the trough sections together make up the trough. Each horizontal motion conveyor in this case preferably comprises a bottom, a first upright side wall and a second upright side wall that together form an oscillating trough, and all oscillating troughs together form the mentioned trough along which the bulk products are moveable.

Preferably, the first side wall of the conveying unit comprises the opening.

Further preferably, this first side wall comprises an upper edge at the top, and the opening forms an interruption of this upper edge. When the gate is being moved, bulk products cannot enter between the upper edge and the gate, because there is no upper edge at the position of the gate. In this case, the gate is preferably designed to move principally downward when the gate moves from the closed position to the open position, and upward when the gate moves from the open position to the closed position.

Also further, in a highly preferred embodiment, the opening extends over substantially the entire height of the first side wall, and the opening thus divides this first side wall into substantially two wall sections that extend at a distance from each other along the main flow. If desired, in this case, all bulk products located against the first side wall may easily pass through the opening, and the bulk products located on the bottom of the main flow may also enter the side flow. This prevents certain bulk products from being unable to leave the main flow. Preferably, this opening extends over the full height of the first side wall. However, there are also embodiments in which the first side wall comprises an upper edge at the top and this upper edge limits the opening in order to ensure the robustness of the conveying unit. Preferably, the first side wall in this case has a relatively great height. If a said gate can take a plurality of positions in relation to the respective opening located between the open position and the closed position, it is also possible to simply regulate the quantity of bulk products that pass through the opening. For example, if the conveying element comprises two or more said openings, and these two or more openings are at a distance from each other along the main flow and wherein bulk products are able to fall through these two or more openings to form two or more side flows, and wherein the one or more conveying units comprise the two or more mentioned openings, it is possible, for example, to place the gate for the first opening upstream in such a way that the opening is partially opened, because the flow rate of the main flow is still at its maximum here. It is then possible to choose to position the downstream gates in such a way that the openings are increasingly more open. The flow rate of a given side flow is controlled very well in this case.

Preferably, the gate extends principally on the outside of the conveying element, i.e. on the outside of the respective conveying unit. The outside of the conveying element is the side of the conveying element that comprises the surfaces that are principally directed outwards. The inward-facing surfaces of the conveying element principally form the boundary of the trough along which the bulk products in the main flow pass. Due to the position of the gate, the gate does not obstruct the flow of bulk products into the conveying element. When the gate is in the closed state, bulk products may easily move along the gate and the gate is not an obstacle to the main flow. Even when the gate is moved, the gate will not damage the bulk products, because the gate does not move in the trough.

This gate can preferably take multiple positions relative to the respective opening, that are located between the open position and the closed position. Here one can determine in a simple way how many bulk products will pass through the opening. If the gate leaves the opening almost completely open in the open position, the gate may be positioned in such a way that the opening is only partially closed. The quantity of bulk products that pass through the opening per time unit may therefore readily be set and may also be adjusted continuously.

Preferably, the dimensions of the gate substantially correspond to the corresponding dimensions of the opening, and the gate in its open position leaves the opening almost completely open.

Preferably, the gate is slidably movable along a straight line or circular arc, with this line or arc extending almost in a plane that extends perpendicular to the main flow at the respective opening. When the main flow extends in a straight first direction, the aforementioned plane extends perpendicularly to that direction.

In a preferred embodiment, the gate comprises an upper edge that is designed to be located at the top in the closed position and in use, wherein this upper edge is designed so as to be moved downward when the gate is moved from the closed position to the open position. By sliding the gate down along the opening, the opening opens gradually. First, the bulk products located above can pass through the opening, and as the gate then goes further down, the bulk products further down may also pass through the opening. When the gate closes again, i.e. when the gate returns to the closed position, the opening is closed gradually, and the risk is low that bulk products will be caught between the gate and the conveying element. In addition, there is usually space on the underside of the conveying element, because the main flow is normally higher than the side flows. This is so that gravity may assist in moving the bulk products to the side flows.

Preferably, when the first side wall of the said conveying unit comprises the opening, viewed in cross-section through the conveying element at this opening, the first side wall extends principally along a circular arc and the respective gate may be moved along a circular arc relative to that opening, wherein both of these arcs extend around almost the same center. In this case, it is easy to move the gate along the opening. During the movement of the gate, the gate also always remains near the conveying element, so that the gate little affects the necessary volume of the conveyor system. For example, when the gate is moved from the closed position to the open position, the gate may be moved under the respective bottom and near this bottom.

Preferably, the gate is so designed that when the gate is moved from the closed position to the open position, it is moved on the underside of the bottom of the conveying unit. During the movement of the gate, in this case, the gate always remains near the conveying element, so that the gate little affects the necessary volume of the conveyor system.

In a highly preferred embodiment, when in use, at least a part of the bottom of the conveying unit that comprises the opening, slopes toward the respective first side wall. In this way, gravity assists in pushing the bulk products against this first side wall. If the gate does not close the opening, the bulk products will then simply fall through the opening with the assistance of gravity. In this way, it is ensured that if bulk products are present on the conveying element just upstream of the opening, these bulk products will at least partially pass through the opening if it is not closed by the gate.

Preferably as well, in use, the said part of the bottom that slopes away, forms an angle of between 5° and 25° with a horizontal plane.

In addition, this bottom is preferably made up of at least two sheet metal parts that extend sideways side by side along the main flow, these sheet metal parts being joined to each other at an angle. These sheet metal parts are joined at a bend, which improves the durability of the bottom. The bottom may thus comprise three such sheet metal parts. With an additional bend, it is also possible to ensure that the bulk products glide very well towards the first side wall and may therefore easily pass through the opening if it is not closed by the gate.

In a preferred embodiment the conveying element comprises two or more said openings, and these two or more openings extend at a distance from each other along the main flow and wherein bulk products are able to fall through these two or more openings to form two or more side flows, wherein the one or more conveying units then comprise the two or more said openings. These two or more openings extend principally at the height of the one or more first side walls. Thus, if there are two or more conveying units, the first side wall of each conveying unit may comprise one opening. For example, a first side wall of a said conveying unit may also comprise two or more openings. If there are two or more conveying units, not all the conveying units need to comprise an opening. The one or more conveying units may extend after one another consecutively in such a way that they extend along a first straight direction. The main flow, in that case, runs in the first direction and the openings extend in the first direction, at a distance from each other when viewed along the first direction. If the conveying element comprises two or more horizontal motion conveyors, each horizontal motion conveyor may comprise a single said opening, and it is also preferable in this case that the first side wall of each horizontal motion conveyor comprises a said opening.

In addition, the conveyor system preferably comprises a said gate for each opening. In this way, each opening is properly closeable and, if necessary, the flow rate of bulk products into one or more side flows can easily be reduced to zero. This is useful when a packaging line is temporarily out of service, or is used for a different product than the one in the main flow. Preferably, in this case, the gates close the openings completely when in the closed position, so that no bulk products may leak through the gates.

In a highly preferred embodiment, the conveyor system comprises a collecting element for each opening, to collect the bulk products that pass through the opening, this collecting element comprising a buffer part for temporarily storing the bulk products. This buffer part ensures that, for example, the packaging machine, which connects to the side flow, is always sufficiently supplied with bulk products. By means of a buffer part, it is also possible to temporarily hold more bulk products if necessary. In this way, it is possible to minimize the frequency of opening and closing a said gate.

Preferably, the conveyor system comprises a collecting element for each opening, for collecting bulk products that pass through the opening, and such a collecting element comprises a collecting surface, this collecting surface being placed near the respective first side wall, so that bulk products passing through the respective opening enter onto this collecting surface, and this collecting surface, when in use, forms a slope between 10° and 60° with the horizontal surface. This collecting surface is placed next to the opening. This slope simplifies dispensing of bulk products, for example onto an additional conveying element located underneath the first conveying element, without the drop height of the bulk product being too high. Specifically, the bulk products are gradually guided via the slope of the collecting surface. If desired, this collecting surface may be positioned very close to the opening at a distance that allows the bulk products to move smoothly through the opening, but is still sufficiently close that the drop height is limited. This is particularly the case if the gate that is able to close the opening, is slidably moveable along a circular arc that almost extends in a plane perpendicular to the main flow at the respective opening and moves downward when the opening is opened. In this case, the gate moves under the respective bottom and near this bottom, so that the collecting surface may be placed close to the opening. For example, the minimum distance between the opening and the respective collecting surface may be less than 30 cm.

In a preferred embodiment, in which the conveying element comprises two or more of said openings, the conveyor system comprises a return conveying element, and this return conveying element on the one hand connects to the back side of the conveying element along the main flow and on the other hand connects to the conveying element at a position between two said openings, for bringing the bulk products at the end of the main flow to said position. If at the end of the conveying element, i.e. past the openings along the main flow, there are still bulk products on the conveying element, these bulk products may be brought back to a different position in the main flow, so that these bulk products will pass along one or more openings again and can thus still enter into a side flow. By not returning the bulk products to the front of the conveying element here, but at a position between two said openings, there is also a greater chance that the flow of the main flow has already decreased because the main flow has already passed through one or more (half-)opened openings along the main flow. As a result, there is a greater chance that the bulk products that are returned to this position will enter into a side flow rather than ending up again at the rear of the conveying element. Consequently, most bulk products are returned at most once using the return conveying element, which reduces the risk of breakage of the bulk products and/or the risk of (bacteriological) contamination.

Further, preferably the aforementioned position is near the upstream opening along the main flow. If this latter opening is not closed by its respective gate, bulk products will pass through the opening. Consequently, there will be few bulk products on the conveying element just past the opening and at the respective first side wall. If the aforementioned position is also at the height of the first side wall, it is ensured that the returned bulk products will be the first to enter the side flow at the next un-closed opening. This ensures even further that most bulk products are returned at most once with the help of the return conveying element, thus reducing the risk of breakage of bulk products and/or the risk of (bacteriological) contamination.

BRIEF DESCRIPTION OF THE DRAWINGS

In the following description, conveyor systems according to this disclosure are described in detail. The sole purpose of this description is to indicate how embodiments of the invention may be realized and to illustrate and, to the extent necessary, further clarify the particular characteristics of embodiments of the invention. Accordingly, this description cannot be regarded as limiting the protective scope of this patent. Nor may the scope of application of embodiments of the invention be limited based on the following description.

In this description, reference is made to the attached drawings, in which.

DETAILED DESCRIPTION

Figure 1:
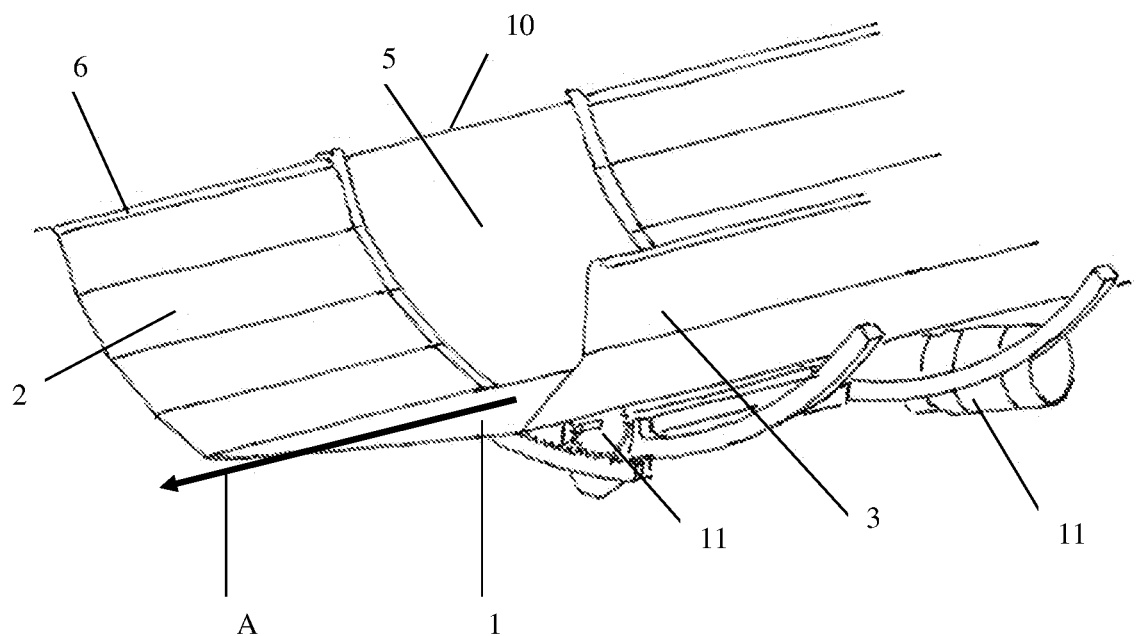
FIG. 1 is a perspective view of a part of a conveyor system according to at least one embodiment of the invention, at the height of an opening that is closable by a gate, the gate being in the closed state.

The drawings partially show a conveyor system for bulk products (9) according to one embodiment of the invention. This conveyor system is specifically used to convey fries (9) and distribute them among eight packaging lines. Fries (9) are produced at a relatively high flow rate, and are subsequently packaged. Because the packaging lines are only able to handle a limited flow rate of fries (9), the fries (9) are divided among a plurality of packaging lines. The conveyor system is used for this purpose.

This conveyor system comprises a conveying element with 8 conveying units, these conveying units being horizontal motion conveyors designed to convey fries (9), originating from a production line, over a certain distance along a main flow (A) that extends in a first direction. These horizontal motion conveyors extend consecutively.

Each horizontal motion conveyor comprises a bottom (1), a first upright side wall (2) and a second upright side wall (3). Each horizontal motion conveyor comprises one opening (4) through which fries (9) are able to fall, so that 8 openings (4) extend at a distance from each other according to the first direction. The fries (9) that pass through the openings (4) form side flows (B) of the main flow (A), so that the fries (9) may be distributed among a maximum of 8 side flows (B). The conveyor system comprises for each opening (4) a gate (5) for closing the respective opening (4), and this gate (5) is moveable continuously between two end positions, namely a closed position at which the gate (5) completely closes the respective opening (4), and an open position at which the gate (5) leaves the respective opening (4) almost completely open, so that fries (9) are able to fall freely from the conveying element through the said opening (4). These openings (4) extend over the full height of the respective first side wall (2) and thus are designed as interruptions of these first side walls (2). Each first side wall (2) is thus divided into 2 wall sections.

Each first side wall (2) comprises 4 sheet metal parts that extend in the first direction and are connected in such a way that the 4 sheet metal parts all touch the same cylindrical surface and thus the cross-sections of the first side wall (2) extend principally along a circular arc. Each gate (5) may be moved slidably along its respective opening (4). The gate (5) in this case is slidable along an arc (C). The gates (5) are connected to the respective conveying units in a slidably movable manner by means of a displacement mechanism (11). This displacement mechanism (11) comprises, among other things, a drive motor, gearwheels and gear racks. The drive motor drives the gearwheels, so that the gear racks may be moved. The gates (5) are connected to the respective gear racks.

Figure 2:
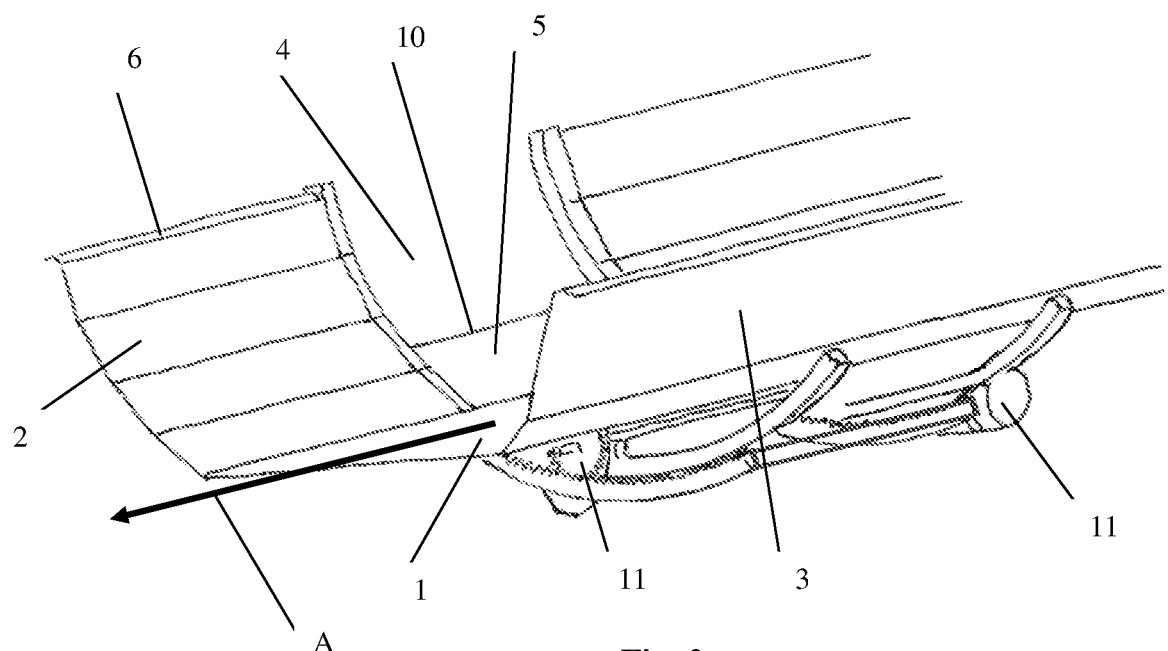
FIG. 2 is a perspective view of what is shown in FIG. 1, with the gate in a half-open state.
Figure 3:
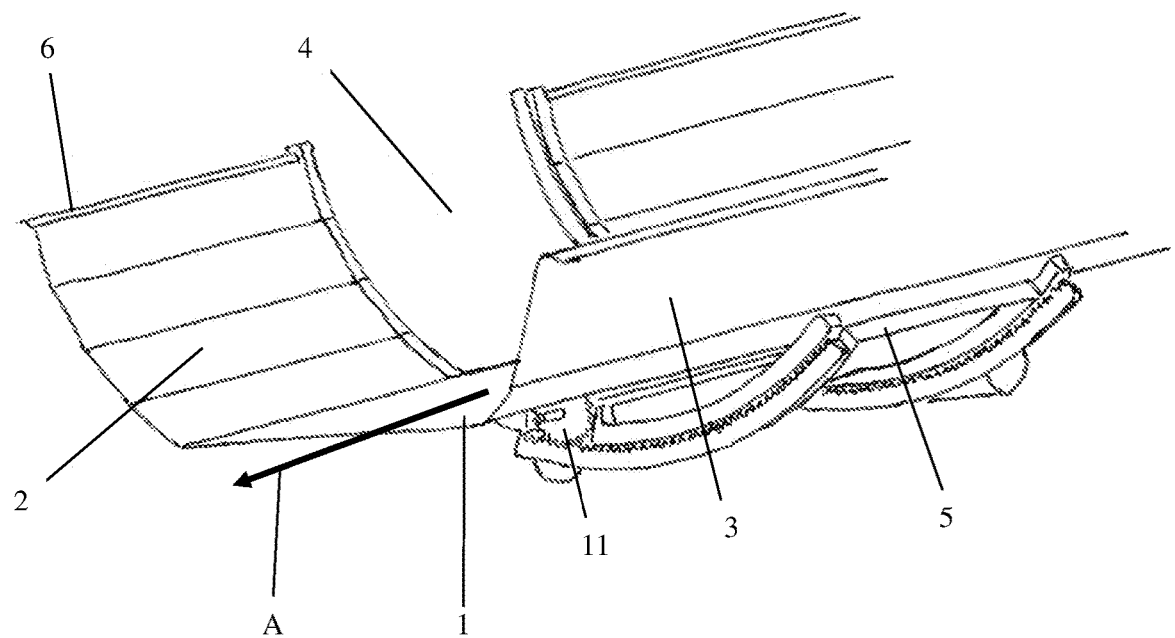
FIG. 3 is a perspective view of what is shown in FIG. 1, with the gate in an open state.

Each first side wall (2) comprises an upper edge (6), and when the respective gate (5) is in the closed position, the upper edge (10) of the gate (5) is in line with the upper edge (6) of the first side wall (2). During the transition to the open position, the upper edge (10) of the gate (5) moves downward so that the opening (4) is gradually opened. The movement of the gate (5) along the arc (C) may be controlled so that it is also possible to choose to leave the opening (4) only partially open (see FIG. 2). Possible positions of the gate (5) are shown in FIGS. 1 to 3.

Due to this arrangement and the possible movement of the gate (5), the risk of fries (9) being caught between the conveying unit and the gate (5) is very low. The risk that fries (9) will break and the conveying unit will be contaminated by fries (9) is therefore low. In the open position, an aforementioned gate (5) is located almost completely underneath its respective conveying unit and particularly underneath the bottom (1) of this conveying unit, so that it is not necessary to provide very much volume underneath the conveying element to ensure the operation of the gates (5). Each bottom (1) has a slope of almost 15° relative to the horizontal plane toward the first side wall (2), so that the fries (9) may drop easily through the openings (4) with the aid of gravity.

Figure 4:
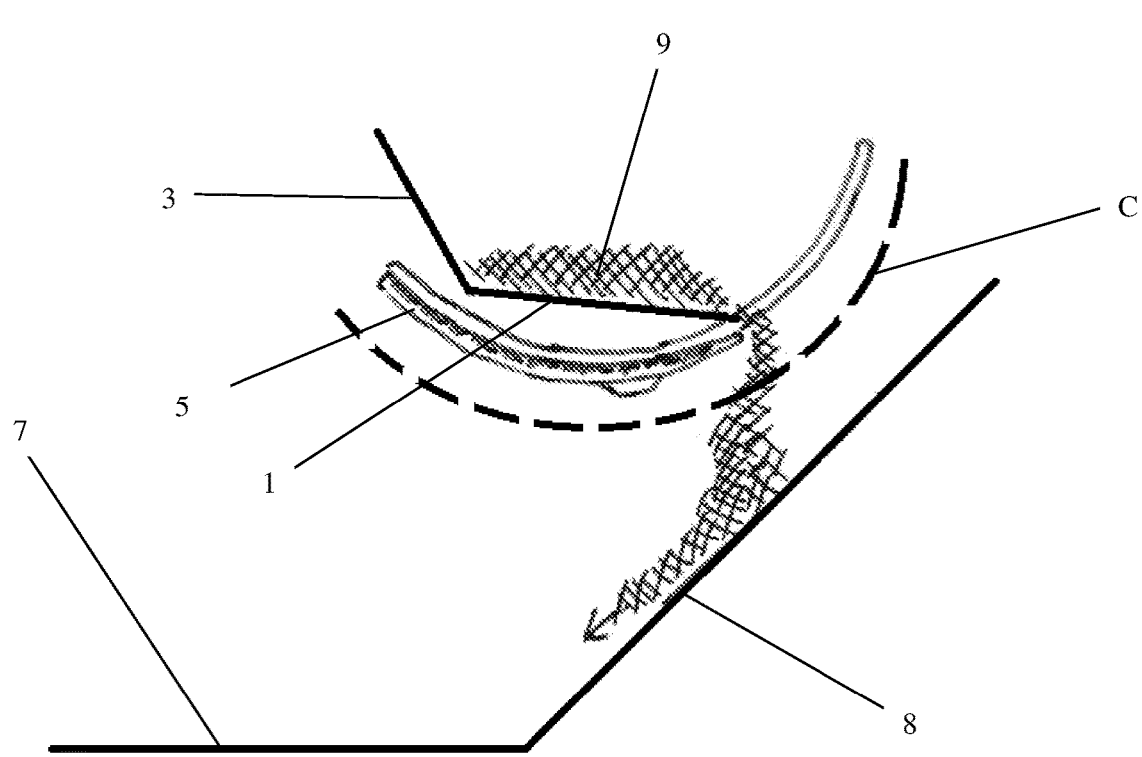
FIG. 4 is a sketch of a cross-section of the conveyor system at the opening.

In addition, the conveyor system comprises for each opening (4) a collecting element (7) with a collecting surface (8), and this collecting surface (8) is then positioned near the opening (4) (see FIG. 4). This collecting surface (8) forms an angle of almost 45° with a horizontal surface and is arranged in such a way that the fries (9) that pass through the opening (4) enter onto the collecting surface (8). This collecting element (7) then connects directly or indirectly to a packaging line where the fries (9) are packed into bags. This packaging line may comprise, for example, a trough, a multi-head scale, a packaging machine, etc. The collecting elements (7) also serve as a buffer to ensure the flow of fries (9) toward the packaging lines.

Figure 5:
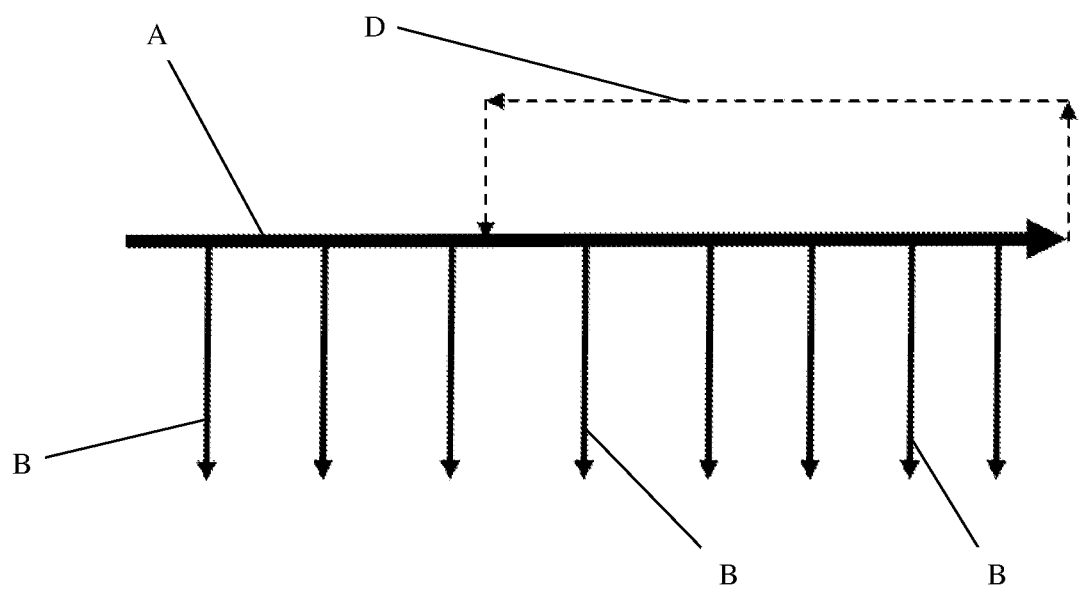
FIG. 5 is a schematic representation of a flow of bulk products that is moved by means of the conveyor system.

The conveyor system additionally comprises a return conveying element, and this return conveying element not only connects to the rear of the conveying element along the main flow (A), but also connects to the conveying element at a position between the third and fourth openings (4) (see FIG. 5 viewed from the left) to bring the fries (9) at the end of the main flow (A) to the aforementioned position along a return flow (D). This position is located just past the third opening (4) and is located on the first side wall (2).

In this conveyor system, the fries (9) enter onto the conveying element from a production line at a relatively high flow rate. The conveying element in this case moves the fries (9) along the main flow (A). Depending on which packaging lines are in operation and depending on the packaging used (500 g, 1 kg, 2.5 kg, etc.), greater or lesser quantities of fries (9) must be brought to the different packaging lines. Thus, the side flows (B) need not all have the same flow rate. To ensure optimum operation of the packaging lines, the gates (5) are used to regulate the flow rate of the side flows (B). Some gates (5) may be in the fully open position, some gates (5) may be in the closed position and other gates (5) may be in the half-open position. In addition, the gates (5) may move to the desired position while the fries (9) are moving. Because each bottom (1) slopes towards the respective first side wall (2), a certain percentage of the fries (9) traveling along the main flow (A) will pass through an opening (4) that they move past when the opening (4) is in the open position. If this opening (4) is in a half-open position, the percentage may be lower. It is therefore possible to closely control the flow of the side flows (B).

The invention claimed is:

1. Conveyor system for bulk products such as food products, comprising a conveying element with one or more contiguous conveying units being horizontal motion conveyors,
wherein each conveying unit comprises a bottom, a first upright side wall and a second upright side wall and wherein these one or more bottoms and these upright side walls form together a trough in which bulk products are movable along a main flow that extends along the trough,
wherein the first upright side wall of the conveying unit comprises an opening through which bulk products are able to fall from the conveying element to form a side flow of bulk products,
wherein the conveyor system comprises a gate for closing the opening,
wherein this gate is movable between at least a closed position that closes the opening, and an open position that leaves the opening at least partially open so that bulk products are able to fall from the conveying element through the opening, wherein the gate is slidable along an exterior surface of the first side wall into the open position, thereby revealing the opening,
wherein a said conveying unit comprises the opening and that this opening extends principally at the height of the first side wall of this conveying unit and in that the gate is movably connected to the conveying unit in such a way that the gate is slidably movable along the said opening,
wherein the conveyor system comprises for each opening a collecting element having a buffer part for temporarily storing the bulk products and a sloping collecting surface being placed near the respective first side wall, so that bulk products passing through the respective opening enter on to the collecting surface.

2. Conveyor system according to claim 1, wherein this first side wall comprises an upper edge at the top and that the opening forms an interruption of this upper edge.

3. Conveyor system according to claim 1, wherein the opening extends over substantially the entire height of the first side wall, and the opening thus divides this first side wall into substantially two wall sections that extend at a distance from each other along the main flow.

4. Conveyor system according to claim 1, wherein the gate extends principally on the outside of the conveying element.

5. Conveyor system according to claim 1, wherein gate can take multiple positions relative to the opening, that are located between the open position and the closed position.

6. Conveyor system according to claim 1, wherein the dimensions of the gate substantially correspond to the corresponding dimensions of the opening and in that the gate leaves the opening almost completely open when in the open position.

7. Conveyor system according to claim 1, wherein the gate comprises an upper edge that is designed to be located at the top in the closed position and in use, wherein this upper edge is designed so as to be moved downward when the gate is moved from the closed position to the open position.

8. Conveyor system according to claim 1, wherein the first side wall of the conveying unit comprises the opening, and that when viewed along a cross-section through the conveying element at this opening, this first side wall extends principally along a circular arc and in that the respective gate is movable along a circular arc in relation to this opening, wherein both of these arcs extend around almost the same center.

9. Conveyor system according to claim 1, wherein the gate is designed to be moved at the height of the underside of the bottom of the conveying unit, when the gate is moved from the closed position to the open position.

10. Conveyor system according to claim 1, wherein in use, at least part of the bottom of the conveying unit that comprises the opening, slopes towards the respective first side wall.

11. Conveyor system according to claim 1, wherein the conveying element comprises two or more said openings, wherein these two or more openings extend at a distance from each other along the main flow and wherein bulk products are able to fall through these two or more openings to form two or more side flows and in that the one or more conveying units comprise the two or more said openings.

12. Conveyor system according to claim 11, wherein the conveyor system comprises a said gate for each opening.

13. Conveyor system according to claim 11, wherein the conveyor system comprises a return conveying element, wherein this return conveying element on the one hand connects to the back side of the conveying element along the main flow and on the other hand connects to the conveying element at a position between two said openings, for bringing the bulk products at the end of the main flow to said position.

14. Conveyor system according to claim 1, wherein the opening is disposed in the first upright side wall, and wherein the gate forms a portion of the first upright side wall and is slidable to reveal the opening.

15. Conveyor system according to claim 1, wherein the gate forms an entire portion of the first side wall and extends over an entire height of the first side wall, thereby dividing the first side wall into a plurality of sections.

16. Conveyor system according to claim 1, wherein the gate comprises an upper edge such that, when the gate is in the closed position, the upper edge of the gate is in line with the upper edge of the first side wall.

\* \* \* \* \*